Nov. 13, 1945.　　　　J. T. KING　　　　2,388,979

FISHING REEL

Filed Jan. 19, 1945

Inventor,

James T. King,

By Albert E. Dieterich,

Attorney.

Patented Nov. 13, 1945

2,388,979

UNITED STATES PATENT OFFICE 2,388,979

FISHING REEL

James T. King, Burbank, Calif.

Application January 19, 1945, Serial No. 573,526

13 Claims. (Cl. 242—84.5)

My invention relates to hydraulically driven fishing reels and it particularly has for its object to improve the reel which constitutes the subject matter of my application Serial Number 517,997, filed January 12, 1944.

Another object is to provide a reel in which the hydraulic motor and the speed reducing gears are all located in a single housing at one side of the reel, the housing being stationary.

Again it is an object to provide a reel which is of a sturdy construction, easy to operate and one in which friction between moving parts is reduced to a minimum.

Other objects will in part be obvious and in part be pointed out hereinafter.

To the attainment of the aforesaid objects and ends, the invention includes those novel details of construction, combination and arrangements of parts all of which will be first described in detail and then be specifically pointed out in the appended claims, reference being had to the accompanying drawing in which:

Figure 1:
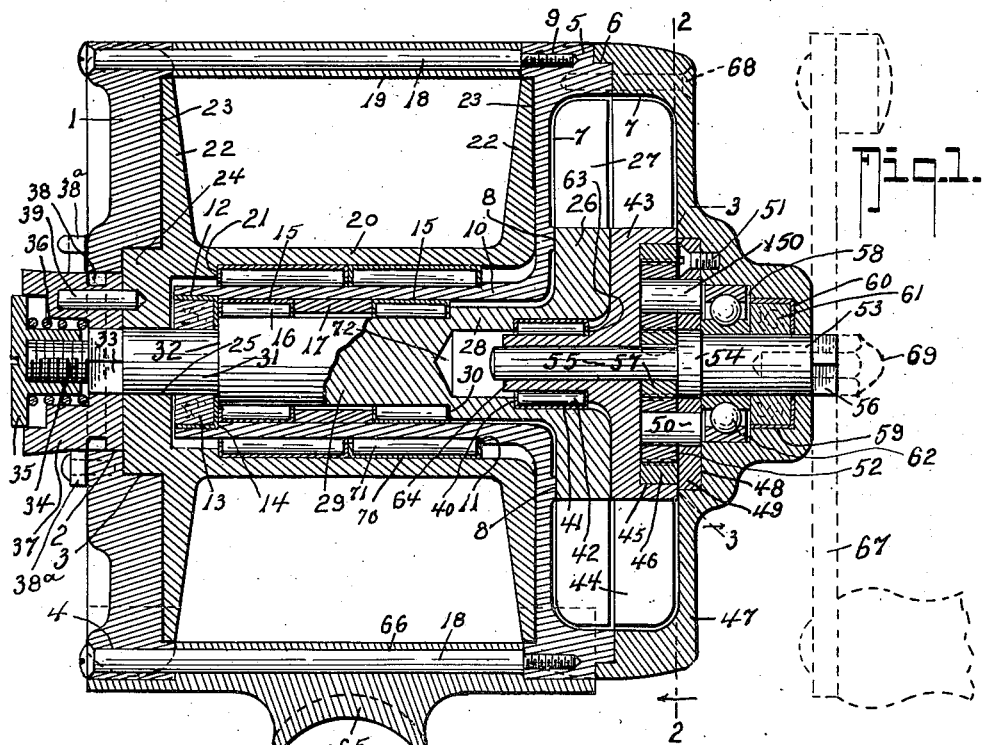
Fig. 1 is a central vertical longitudinal section of a reel embodying my invention.
Figure 2:
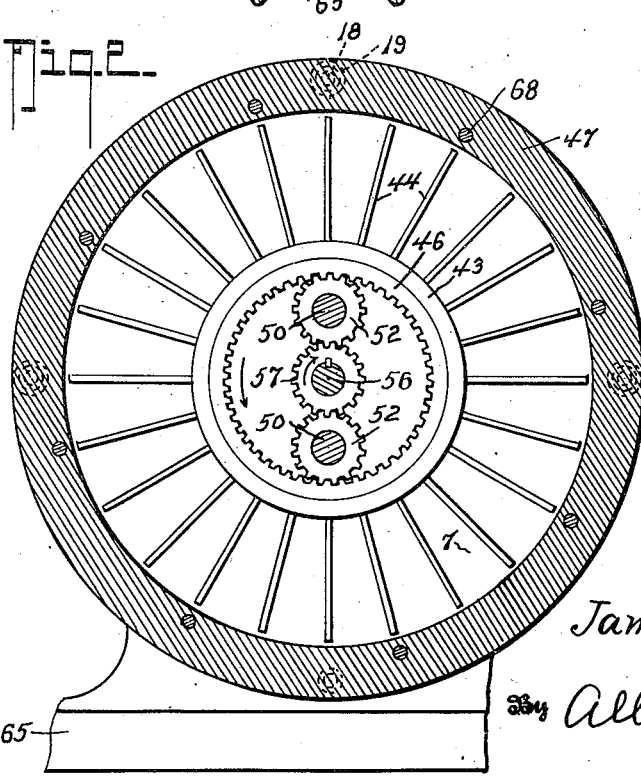
Fig. 2 is a cross-section on the line 2—2 of Fig. 1, parts being broken away.
Figure 3:
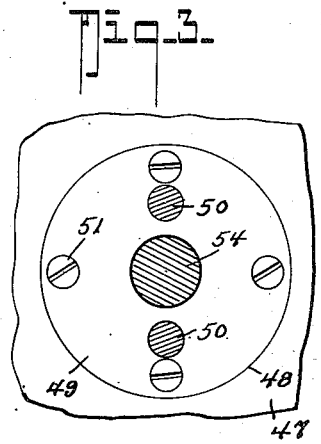
Fig. 3 is a detail section on the line 3—3 of Fig. 1.

In the drawing in which like numerals and letters of reference indicate like parts in all the figures, I represents one side plate of a support and 5 represents the other side plate. These side plates are joined together in spaced relation by screw bolts 18 that pass through holes 4 in the side plate 1, through spacers 19 and through the bore 66 of a saddle member 65, and are screwed at 9 into the side plate 5.

The side plate I has a central bore 2 and a counter bore 3 while the side plate 5 is cupped to provide one half of a chamber 7, the other half of which is located in the cover member 47 that is step-jointed at 6 to the side plate 5 and held thereto by screws 68. The plate 5 has an annular bearing surface 8 in the chamber 7 and is also provided with a tubular hub 10 that extends toward the side plate I and has a shoulder II serving as a stop for the cage 70 of a roller bearing 71. The end of the hub 10 carries, internally, a packing cup 12 (resting against a shoulder 14) and a packing 13, hereinafter again referred to.

Within the chamber 7 are two impellers 26 and 43 co-axially mounted side-by-side and having blades 27 and 44 respectively. The impeller 26 has a shaft 28 having a first portion 29 of reduced diameter thereby providing a shoulder 30, a second portion 31 of a further reduced diameter, thereby providing a second shoulder 32, a squared portion 33 and a threaded end 34. The shaft 28 has a blind bore and counter-bore, 72, thereby providing a shoulder 40 against which, in the counter-bore portion, rests the cage 41 of a roller bearing 42. The impeller 43 also has a short shaft 64 and a shoulder 63 to cooperate with the roller bearing 42 and its cage 41.

Mounted between the packing cup and the shoulder 30 are roller bearings 16 whose cups 15 are spaced apart by a spacing ring 17, there being one cup 15 resting against shoulder 30 while the other cup 15 rests against the packing cup 12. The rollers roll around shaft 28.

The spool hub 20 has side flanges 22 that lie in recesses 23 in the end plates I and 5. A projecting end 24 of the hub lies in counter-bore 2. The end 24 has a hole 25 for the portion 31 of the shaft 28. The spool hub has an internal shoulder 21 between which and the shoulder 11 the bearing cages 70 lie with the rollers 71 rolling on the outer surface of hub 10.

A bearing and clutch member 37 fits, within the opening 2, on the squared portion 33 of shaft 28 and is held thereon by a flanged nut 35 threaded on the shaft end 34, a spring 36 being interposed between the flange of the nut 35 and the member 37. The member 37 has a driving pin 39 that enters a recess in the hub extension, and it also has a groove 38, as shown. From the foregoing it will be observed that the shaft 28 and impeller 26 turn with the spool 20 as a unit. By pulling out on the member 37 against the spring tension, the pin 39 will become disconnected from the spool and the spool will be left free. When the member 37 is out a pivoted latch bar 38a may be brought into the groove 38 to hold the member disengaged from the spool. When the latch bar 38a is withdrawn from groove 38 the spring 36 will force the clutch member 37 in again and hold the clutch against accidental disconnection. The force of the spring also serves to hold the driven impeller 26 against the bearing surface 8 (the spring 36 does not engage the end of the squared part 33 but its ends only engage the parts 35 and 37 respectively).

The impeller 43 has a recess 45 in which is fitted a ring gear 46 which turns with the impeller and meshes with gears 52 that are freely rotatable on stub shafts 50 carried by a plate 49 that is mounted, with screws 51, in a recess 48 in the outer section or cover portion of the combined impeller and gear case 5, 47.

The case section 47 also has recesses 58 and 59 for a ball bearing 62 and a packing cage 60 and packing 61. A drive shaft 53 passes through the case section 47, packing 61 and ball bearing 62 and has a collar 54 turning in a bearing hole in plate 49 and has a reduced spindle-extension 55 on which, between shoulders 40 and 63 the roller cage 41 and rollers 42 are located. The shaft 53 has a squared end 56 on which the operating crank 67 is held by a cap screw 69. A driving gear 57 is keyed to the spindle-extension 55 and meshes with gears 52.

The chamber 7 is filled, in any suitable way, with a suitable liquid (not shown), some of which works to bearings 16, 42, gearing 46, 52, 57 and bearing 62, etc., to lubricate the same. Escape of any substantial quantity of liquid around shaft portions 31 and 53 is prevented by the packing rings 13 and 61 respectively.

Turning crank 67 clockwise, causes rotation of impeller 43 counter-clockwise at a reduced speed (3 to 1 as illustrated). As impeller 43 is driven by turning crank 67 as stated, it will, through the liquid, cause impeller 26 to turn in the same direction and thereby turn the spool 20 with it to reel in the line. With the line running out it is only necessary to hold crank 67 still or reverse its direction of turn, in order to apply the amount of braking force required or desired, as will be clear to those skilled in the art.

From the foregoing description taken in connection with the accompanying drawing it is thought the construction, operation and advantages of the invention will be clear to those skilled in the art.

What I claim is:

1. In a hydraulically operated fishing reel: a support comprising a side member, a combined impeller and gear case constituting a second side member, cross connections and spacers joining said side members in spaced relation; a spool mounted between said side members and having a hollow hub; a driven impeller in said case and having a shaft having a bore and extending through said spool and the first mentioned side members; an operative connection between said shaft and said spool; a driving impeller in said case and having a tubular shaft projected into said bore; a drive shaft journalled in said case and in said tubular shaft; a drive pinion on said drive shaft within said case; other pinions carried by said case and meshing with said drive pinion; a ring gear carried by said second impeller within said case and meshing with said other pinions; an antifriction bearing located between said drive shaft and said case; and another antifriction bearing between the shafts of both impellers.

2. In a hydraulically operated fishing reel; a support including a pair of spaced end members rigidly connected together in spaced-apart relation, one of said members constituting a combined fluid, impeller and gear case; a driving impeller within said case, said driving impeller having a recess; a ring gear mounted in said recess; idler gears mounted in said case and meshing with said ring gear; a drive shaft journalled in said case and in said driving impeller; one of said spaced-apart members having a tubular hub extending to adjacent the other of said spaced-apart members; a spool journalled on said tubular hub; a driven impeller within said case and having a shaft projecting through and journalled in said hollow hub; and a coupling between said driven impeller shaft and said spool.

3. In a hydraulically operated fishing reel; a support including a pair of spaced end members rigidly connected together in spaced-apart relation, one of said members constituting a combined fluid, impeller and gear case; a driving impeller within said case, said driving impeller having a recess; a ring gear mounted in said recess; idler gears mounted in said case and meshing with said ring gear; a drive shaft journalled in said case and in said driving impeller; one of said spaced-apart members having a tubular hub extending to adjacent the other of said spaced-apart members; a spool journalled on said tubular hub; a driven impeller within said case and having a shaft projecting through and journalled in said hollow hub; and a coupling between said driven impeller shaft and said spool, said coupling comprising a squared extension of said last named shaft, a bearing member on said squared extension and journalled in said support, a pin connection between said bearing member and said spool and a resilient end-thrust connection between said last named shaft and said bearing member.

4. In a fishing reel: two spaced-apart side members rigidly coupled together and constituting a stationary support, one of said side members having a bearing aperture, the other of said side members being hollow, to provide a combined impeller, fluid and gear case, and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool; a driving shaft journalled in said case and in said driving impeller; a driving gear on said driving shaft; at least one stationary idler gear in said case meshing with said driving gear; and a ring gear carried by said driving impeller within said case and meshing with said idler gear.

5. In a fishing reel: two spaced-apart side members rigidly coupled together and constituting a stationary support, one of said side members having a bearing aperture, the other of said side members being hollow, to provide a combined impeller, fluid and gear case, and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool; a driving shaft journalled in said case and in said driving impeller; a driving gear on said driving shaft; at least one stationary idler gear in said case meshing with said driving gear; and a ring gear carried by said driving impeller within said case and meshing with said idler gear, said driving impeller having a recess to contain said gears.

6. In a fishing reel: two spaced-apart side members rigidly coupled together and constituting a stationary support, one of said side members having a bearing aperture, the other of said side members being hollow, to provide a combined impeller, fluid and gear case, and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool; a driving shaft journalled in said case and in said driving impeller; a driving gear on said driving shaft; at least one stationary idler gear in said case meshing with said driving gear; and a ring gear carried by said driving impeller within said case and meshing with said idler gear, and antifriction bearings interposed between said spool and said tubular hub and between said driving and driven impellers.

7. In a fishing reel: two spaced-apart side members rigidly coupled together and constituting a stationary support, one of said side members having a bearing aperture, the other of said side members being hollow, to provide a combined impeller, fluid and gear case, and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool; a driving shaft journalled in said case and in said driving impeller; a driving gear on said driving shaft; at least one stationary idler gear in said case meshing with said driving gear; and a ring gear carried by said driving impeller within said case and meshing with said idler gear, said driving impeller having a recess to contain said gears, and antifriction bearings interposed between said spool and said tubular hub and between said driving and driven impellers.

8. In a fishing reel: two spaced-apart side members rigidly coupled together and constituting a stationary support, one of said side members having a bearing aperture, the other of said side members being hollow to provide a combined impeller, fluid and gear case and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool, said operative connection comprising a shaft located in part in said tubular hub, and antifriction bearings between said last named shaft and said tubular hub; a driving shaft journalled in said case and in said driving impeller; a driving gear on said driving shaft; at least one stationary idler gear in said case meshing with said driving gear; and a ring gear carried by said driving impeller within said case and meshing with said idler gear.

9. In a fishing reel: two spaced-apart side members rigidly coupled together and constituting a stationary support, one of said side members having a bearing aperture, the other of said side members being hollow to provide a combined impeller, fluid and gear case and having a tubular hub; a driving impeller mounted in said case; a driven impeller in said case and having a shaft rotatably mounted in said tubular hub; a spool rotatably mounted on said tubular hub between the side members of said support; an operative connection between said driven impeller and said spool, said operative connection comprising a shaft located in part in said tubular hub, and antifriction bearings between said last named shaft and said tubular hub; a driving shaft journalled in said case and in said driving impeller; a driving gear on said driving shaft; at least one stationary idler gear in said case meshing with said driving gear; and a ring gear carried by said driving impeller within said case and meshing with said idler gear, and antifriction bearings interposed between said spool and said tubular hub and between said driving and driven impellers.

10. In a fishing reel: a support which includes two spaced-apart side members one of which has a hollow hub extending to adjacent the other; a spool journalled on said hollow hub between said side members, said side member having the hollow hub comprising a combined impeller, fluid and gear case; a driven impeller in said case and having a shaft journalled in said hollow hub; said case having a contact surface for said impeller; a spring-loaded coupling between said shaft and said spool having provision for maintaining contact between said driven impeller and said contact surface; a driving impeller in said case; a drive shaft journalled in said case; and a power transmitting connection between said driving shaft and said driving impeller.

11. In a fishing reel: a support which includes two spaced-apart side members one of which has a hollow hub extending to adjacent the other; a spool journalled on said hollow hub between said side members, said side member having the hollow hub comprising a combined impeller, fluid and gear case; a driven impeller in said case and having a shaft journalled in said hollow hub; said case having a contact surface for said impeller; a spring-loaded coupling between said shaft and said spool having provision for maintaining contact between said driven impeller and said contact surface; a driving impeller in said case; a drive shaft journalled in said case; and a power transmitting connection between said driving shaft and said driving impeller, said driving connection including speed reducing gearing located in a recess in said driving impeller.

12. In a fishing reel: a support including a pair of spaced-apart side members rigidly connected together; one of said rigidly connected members having an impeller-receiving chamber and a tubular hub; a driving impeller within said impeller-receiving chamber; a spool mounted between said side members and having a hollow hub; a driven impeller within said impeller-receiving chamber and having a shaft extending through the hub of said one of said rigidly connected members; a shiftable clutch connection between said spool and said driven impeller shaft; a driving shaft carried by said one of said rigidly connected members; power transmitting gear connections between said driving shaft and said driving impeller; and a liquid within said impeller-receiving chamber.

13. The fishing reel of claim 12 wherein means are provided for holding said clutch connection out of clutching action at will.

JAMES T. KING.